Aug. 3, 1943.  L. M. NAY  2,325,626
FLUID BRAKE
Filed April 3, 1942  2 Sheets-Sheet 1

Lafayette M. Nay
INVENTOR

BY Victor J. Evans & Co.
ATTORNEYS

Aug. 3, 1943.   L. M. NAY   2,325,626
FLUID BRAKE
Filed April 3, 1942   2 Sheets-Sheet 2
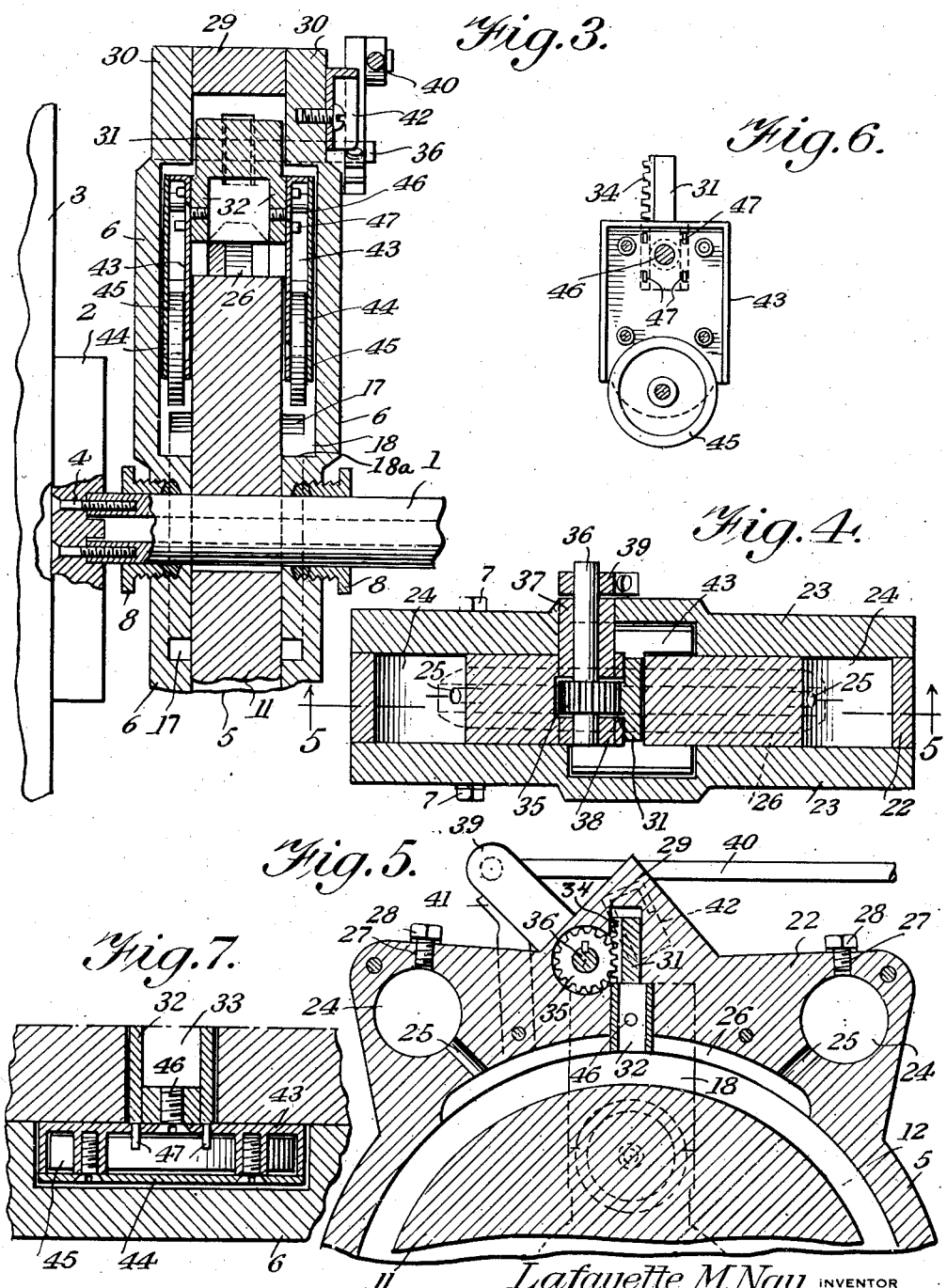
Lafayette M. Nay INVENTOR
BY Victor J. Evans & Co.
ATTORNEYS Patented Aug. 3, 1943

2,325,626

UNITED STATES PATENT OFFICE 2,325,626

FLUID BRAKE

Lafayette M. Nay, Placentia, Calif.

Application April 3, 1942, Serial No. 437,578

7 Claims. (Cl. 188—90)

This invention relates to fluid brakes, and its general object is to provide a brake for use with any rotatable member for braking the same, but is primarily designed for vehicle wheels and includes a rotor mounted in a stator or casing to revolve in fluid therein, the rotor having the wheel fixedly associated therewith and including vanes for circulating the fluid under normal running condition, but when it is desired to brake the wheel, suitable means is rendered active by foot or hand controls, to cooperate with the vanes to retard or stop the circulation, thus compressing the fluid to bring about a braking action upon the wheel.

An important object is to provide a fluid brake that not only includes novel fluid flow retarding means, but also means carried thereby to bring about radial movement of the vanes, out of the path of the retarding means, when the latter is moved to active position.

A further object is to provide a fluid brake that includes fluid reservoirs within the rotor casing, and which have direct communication with an annular vane chamber or space between the rotor and the casing, so that an ample quantity of fluid is maintained within that space at all times.

Another object is to provide a fluid brake that is constructed in a manner whereby ready access can be had to all the parts, and the brake is simple in construction, inexpensive to manufacture, easy to install, and extremely efficient in operation, use and service.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 3 is a sectional view taken approximately on line 3—3 of Figure 1, looking in the direction of the arrows, but likewise illustrates the hub and wheel of Figure 2.

Figure 4 is a sectional view taken approximately on line 4—4 of Figure 1, looking in the direction of the arrows.

Figure 5 is a sectional view taken approximately on line 5—5 of Figure 4, looking in the direction of the arrows.

Figure 6 is a detail view of the fluid retarding and vane shifting means, with the cover plate of the shifting means removed.

Figure 7 is a sectional view taken approximately on line 7—7 of Figure 1, looking in the direction of the arrows.

Figure 1:
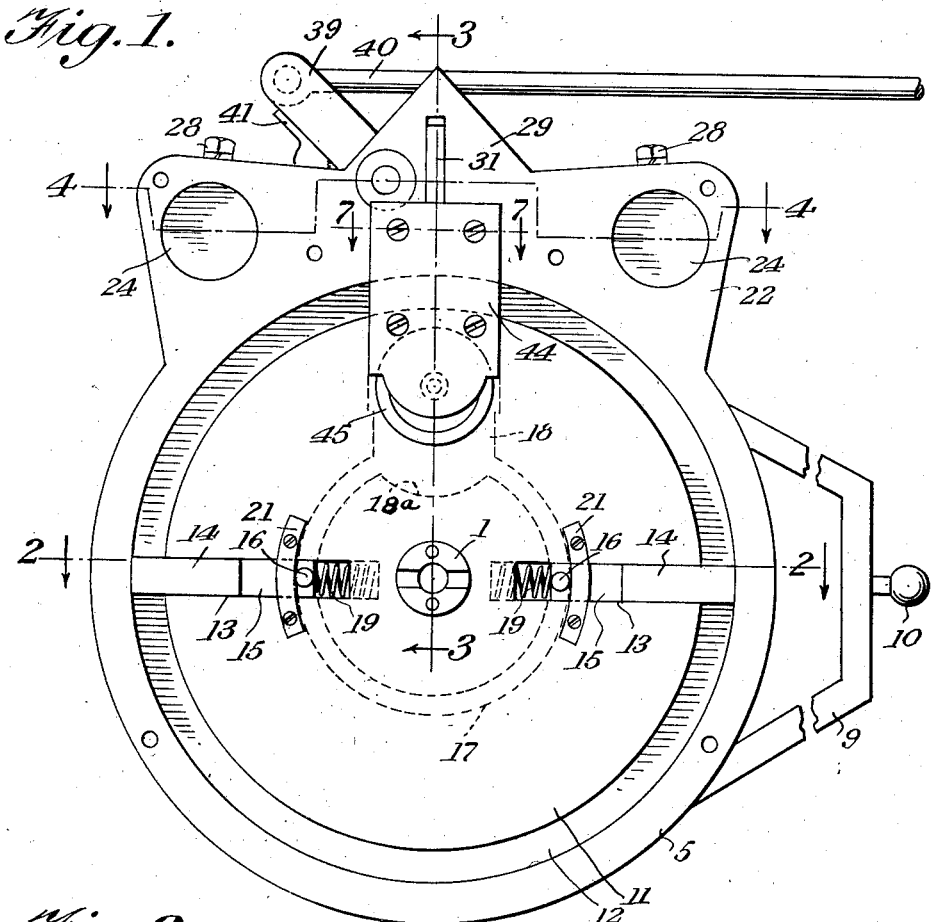
Figure 1 is a front view of one of my brake units, with the front cover plate removed.

Referring to the drawings in detail, it will be noted that while I have illustrated only one of my brake units or devices, it will be obvious that four can be used on a vehicle, that is one for each wheel, but of course the device is applicable to any rotatable member for braking the same. In any event, in the form shown, the reference numeral 1 indicates a shaft or axle, and 2 the hub of a wheel 3, the hub being fixed to the shaft by a tongue and groove connection and bolts 4, as best shown in Figure 3.

The device includes a casing or stator that comprises a ring like body 5 and cover plates 6 closing the sides thereof, the cover plates being secured to the body by bolt and nut connections 7, and the plates have centrally disposed openings therein through which passes the shaft 1. The openings of the plates have their outer portions enlarged for packing and threaded therein are gland nuts 8 to provide a leakproof connection between the casing and the shaft, and a leakproof connection is likewise provided between the body and the cover plates by gaskets, as best shown in Figure 2.

The casing is of course held against rotation, and in the form shown I provide an attaching bracket 9 formed on or otherwise secured to the body 5, and the bracket is adapted to have universal connection with the chassis of a vehicle, by a ball and socket joint, the ball of which being indicated by the reference numeral 10.

Keyed or otherwise secured to the shaft 1 for rotation therewith is a rotor or drum 11 that is mounted concentrically within the casing and is of a diameter to provide an annular fluid receiving space or chamber 12 about the same, as best shown in Figure 1. The rotor is provided with a pair of oppositely disposed slots 13 extending transversely and radially therethrough from adjacent its center and mounted in the slots for slidable movement are flat vanes 14 having reduced inner end portions 15 which have formed thereon and extending from the opposite sides of their extreme inner ends, studs 16 that travel in annular grooves 17 disposed in the inner faces of the cover plates that likewise have in the upper portions thereof, vertically disposed substantially rectangular recesses or pockets 18. The lower ends of the recesses 18 intersect the upper portions of the grooves 17 and provide depressions 18a with which the upper ends of the grooves communicate, as best shown in Figure 1, to allow inward movement of the vanes for a purpose which will be later described, and against the action of coil springs 19.

Figure 2:
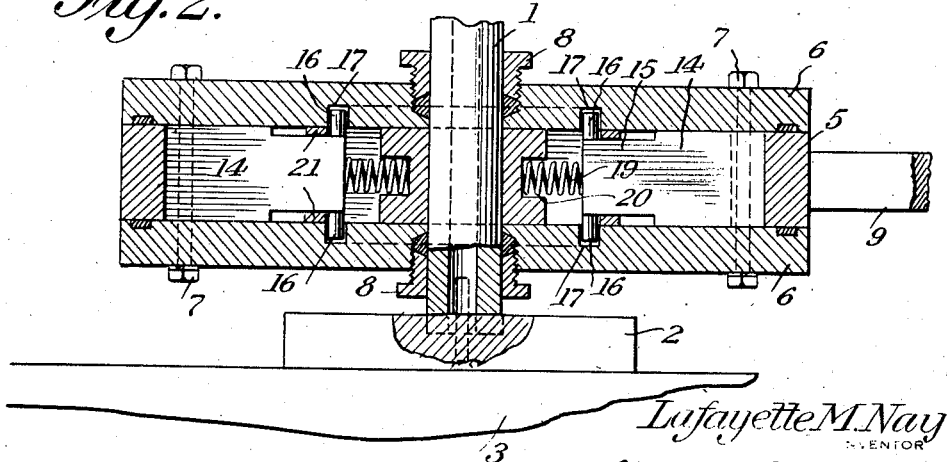
Figure 2 is a sectional view taken approximately on line 2—2 of Figure 1, looking in the direction of the arrows, with a wheel attached to the shaft or axle that has the rotor fixed thereto.

The springs 19 are mounted in sockets 20 at the inner ends of the slots 13 and engage the vanes for urging the latter outwardly against the inner circumference of the body 5 for wiping engagement therewith, and of course to bridge the space or chamber 12, as will be apparent upon inspection of Figures 1 and 2 which likewise disclose arcuate strips 21 fixed to and countersunk in the side faces of the rotor in the path of the studs, to limit outward movement of the vanes and to hold the latter associated with the rotor when removed from the casing.

The upper portion of the body 5 is formed to provide an elongated horizontally disposed solid block like member 22 having horizontally arranged cylindrical bores extending therethrough adjacent the ends thereof, the bores being closed by upper extensions 23 shaped to fit the sides of the member 22 and formed on the cover plates, so that the bores provide fluid reservoirs 24 having direct communication with the fluid space or chamber 12 by ports 25 that have their outlet ends opening into an inverted channel 26 extending longitudinally of the inner face of the member 22, as best shown in Figure 5. The reservoirs have inlet openings 27 that are closed by screw plugs 28. By that construction, it will be obvious that the space or chamber 12 is filled with fluid from the reservoirs so that an ample quantity of fluid is maintained therein at all times. The member 22 as well as the extensions 23 are formed with centrally disposed substantially triangular shaped upright portions 29 and 30 respectively.

From the structure so far described, it will be seen that the wheel 3 is free to travel due to the fact that the fluid freely circulates or revolves within the space or chamber 12, in that it is carried accordingly by the vanes, but in order to brake the wheel, I provide a fluid flow retarding or stop member in the form of a valve which cooperates with the vanes for that purpose, that is the retarding member is movable for disposal across the space or chamber 12 to retard or stop the flow of the fluid, and consequently the rotor, to bring about a braking action upon the wheel.

The retarding member in the form shown includes an upper flat shank portion 31 and a lower hollow relatively wide flat body portion 32, and the retarding member is fittingly and slidably mounted in a socket 33 that extends along the vertical center of the member 22 and the upright portion 29, as best shown in Figure 5. Fixed to the shank portion are rack teeth 34 having a toothed pinion 35 meshing therewith, the pinion being keyed to a stub shaft 36 that is mounted for rotation in a bearing sleeve 37 and a collar 38, as best shown in Figure 4, which likewise shows that the shaft 36 extends beyond the outer end of the sleeve and has a lever 39 fixed to the extending end thereof. The opposite end of the lever has a connecting rod 40 attached thereto and the rod of course has suitable connection with control means, such as a hand lever or foot pedal or both, to bring about the application of the brake in the usual manner.

Secured to one of the cover plates 6 for disposal in the path of the lever 39 are abutment members 41 and 42 to limit swinging movement of the lever, and consequently the movement of the retarding member to its normal and operative positions, as will be apparent upon inspection of Figure 5.

In order to move the vanes 14 out of the path of the retarding member when the latter is being moved to its operative position, across the space or channel 12, I provide a pair of cam members, each of which includes a relatively narrow housing 43 provided with a cover plate 44 secured to the body thereof by screws, and mounted in the housing is a roller 45 to extend beyond the arcuate open end thereof. The rollers are readily removable in that they are held on shafts by the cover plates and the shafts are secured to the rear walls of the bodies of the housing for disposal in bridging relation therewith.

The cam members are removably secured to the end walls of the body portion 32 of the retarding member by screws 46, for disposal in depending relation therefrom, upon opposite sides of the rotor and within the pockets 18. Cooperating with the screws 46 are ears 47 that are formed on and extend laterally from the ends of the side walls of the body portion 32 and are mounted in slots in the rear walls of the cam members to hold the latter against casual displacement relative to the retarding member, as will be apparent. By that construction, it will be obvious that the cam members are carried by the retarding member and are movable against the studs 16 to move the vanes inwardly against the action of their springs, to allow free passage of the vanes by the retarding member when the latter is moved to its operative position.

The operation of the brake may be described briefly as follows: The retarding member 31—32 is normally in the retracted or inactive position in which it is shown in Figure 5 of the drawings. When the retarding member 31—32 is in this position, no part thereof extends across the compression chamber 12, and due thereto the oil in the compression chamber will circulate freely under the influence of the vanes 14 when the rotor 11 is turning. When it is desired to stop the rotor 11, the retarding member 31—32 is moved into operative position. When the retarding member 31—32 is in this position, the body portion 32 thereof extends across the compression chamber 12 and stops the circulation of the oil in the compression chamber and thus effects the stopping of the rotor. During the movement of the retarding member 31—32 into operative position, the rollers 45 move inwardly into position for contact by the studs 16 of that vane 14 that is closer to the inwardly moving retarding member. The contact of the studs 16 with the rollers 45 effects the retraction of such vane sufficiently to permit it to pass the inwardly moving retarding member 31—32. After passing the retarding member 31—32, the vane is returned to its normal position by its spring 19. The inward movement of the studs 16 with relation to the rotor 11, under the influence of the rollers 45, is permitted by the recesses 16a. The compression chamber 12 is formed by the ring 5, cover plates 6 and the retarding member 31—32, and the compression is effected by one of the vanes 14. The compression is also transmitted to that cylinder 24 located between the retarding member 31—32 and the compressing vane. The housings 43 which carry the rollers 45, are mounted in the recesses 18 formed radially in the side walls of the compression chamber 12, and in effect constitutes a part of the retarding member 31—32.

It is to be understood that changes may be made in the construction, and in the combination and arrangement of the several parts, provided that such changes fall within the scope of the appended claims.

What I claim is:

1. In a fluid brake, a casing, a rotor concentrically mounted in the casing and spaced therefrom to provide an annular fluid receiving chamber, spring pressed slidably mounted vanes carried by the rotor and normally held in wiping engagement with said casing for circulating the fluid about the chamber, means mounted in the casing for movement into the chamber to cooperate with the vanes for retarding the circulation of the fluid to set up a braking action, means for moving the retarding means into and out of the chamber, and means for diverting the vanes about the retarding means and carried by the latter.

2. In a fluid brake, a casing, a rotor concentrically mounted in the casing and spaced therefrom to provide an annular fluid receiving chamber, spring pressed slidably mounted vanes carried by the rotor and normally held in wiping engagement with said casing for circulating the fluid about the chamber, means mounted in the casing for movement into the chamber to cooperate with the vanes for retarding the circulation of the fluid to set up a braking action, means for moving the retarding means into and out of the chamber, studs secured to and extending laterally from the inner ends of the vanes, and cam means carried by the retarding means for disposal in the path of the studs for diverting the vanes about the retarding means.

3. In a fluid brake, a casing, means to hold the casing against rotation, a rotor concentrically mounted in the casing and spaced therefrom to provide an annular fluid receiving chamber, spring pressed slidably mounted vanes carried by the rotor and normally held in wiping engagement with said casing for circulating the fluid about the chamber, said casing having a socket in the upper portion thereof, means including a shank and mounted in the socket for movement into the chamber to cooperate with the vanes for retarding the circulation of the fluid to set up a braking action, manually actuated means including rack teeth on the shank and a pinion meshing with the teeth for moving the retarding means into and out of the chamber, studs formed on the sides of the vanes, and cam means secured to the sides of the retarding means and including rollers arranged in the path of the studs for diverting the vanes about the retarding means.

4. In a fluid brake, a casing, a rotor concentrically mounted in the casing and spaced therefrom to provide an annular fluid receiving chamber, spring pressed slidably mounted vanes carried by the rotor and normally held in wiping engagement with said casing for circulating the fluid about the chamber, means mounted in the casing for movement into the chamber to cooperate with the vanes for retarding the circulation of the fluid to set up a braking action, manually controlled means for moving the retarding means into and out of the chamber, means for diverting the vanes about the retarding means and carried by the latter, and a pair of fluid reservoirs in the upper portion of the casing and being in direct communication with the chamber for supplying the same with fluid.

5. In a fluid brake, a casing including a ring like body, cover plates removably secured to the sides of the body for closing the same, a rotor concentrically mounted in the body and spaced therefrom to provide an annular fluid receiving chamber, spring pressed slidably mounted vanes carried by the rotor for radial movement relative thereto and normally held in wiping engagement with the body for circulating the fluid about the chamber, an elongated horizontally disposed solid block like member providing the upper portion of the body and having horizontally disposed bores extending therethrough adjacent its ends, extensions formed on the cover plates and shaped to fit the sides of said member for closing the ends of the bores to provide fluid reservoirs, said reservoirs having direct communication with the chamber, said member having a centrally and vertically arranged socket therein, means slidably mounted in the socket for movement into the chamber to cooperate with the vanes for retarding the circulation of the fluid to set up a braking action, manual actuating means for moving the retarding means into and out of the chamber, and roller cam means carried by the retarding means for disposal in the path of the vanes for diverting the latter about the retarding means.

6. In a fluid brake, a casing including a ring like body, cover plates removably secured to the sides of the body for closing the same, a rotor concentrically mounted in the body and spaced therefrom to provide an annular fluid receiving chamber, spring pressed slidably mounted vanes carried by the rotor and normally held in wiping engagement with the body for circulating the fluid about the chamber, said body having a socket in the upper portion thereof, means including a shank and a body portion slidably mounted in the socket for disposal of said body portion into the chamber to cooperate with the vanes for retarding and stopping the circulation of the fluid to set up a braking action, manual means for moving the retarding means into and out of the chamber, said cover plates having pockets and substantially annular grooves in the inner faces thereof with the grooves communicating with the pockets above the lower ends of the latter, studs secured to the inner ends of the vanes and mounted for travel in the grooves, cam members secured to the sides of said body portion in depending relation therefrom and slidably mounted in the pockets, and rollers included in the cam members and journaled at the lower ends thereof for disposal in the path of the studs for diverting the vanes about the retarding means.

7. In a fluid brake for a vehicle wheel fixed to a shaft, a casing, a bracket fixed to the casing and including means to have universal connection with the chassis of a vehicle to hold the casing against rotation, a rotor keyed to the shaft and concentrically mounted in the casing, said rotor being of a diameter relative to that of the casing to provide an annular fluid receiving chamber, said rotor having radially disposed slots therein opening through its outer periphery, spring pressed vanes mounted in the slots and normally held in wiping engagement with said casing for circulating the fluid about the chamber, means mounted in the casing for movement into the chamber to cooperate with the vanes for retarding the circulation of the fluid to set up a braking action, manual control means for moving the retarding means into and out of the chamber, brackets secured to the casing and arranged in the path of the control means to limit the movement of the retarding means, and means for diverting the vanes about the retarding means when the latter is moved into the chamber.

LAFAYETTE M. NAY.